United States Patent [19]

Davies

[11] 4,071,370

[45] Jan. 31, 1978

[54] MAGNESITE-CHROME REFRACTORY

[75] Inventor: Ben Davies, Pittsburgh, Pa.

[73] Assignee: Dresser Industries, Inc., Dallas, Tex.

[21] Appl. No.: 783,128

[22] Filed: Mar. 31, 1977

[51] Int. Cl.² .................. C04B 35/04; C04B 35/12
[52] U.S. Cl. ......................................................... 106/59
[58] Field of Search ............................................ 106/59

[56] References Cited

U.S. PATENT DOCUMENTS

| 3,192,058 | 6/1965 | Davies et al. ................. 106/59 |
| 3,258,353 | 6/1966 | Heuer ............................ 106/59 |
| 3,312,457 | 4/1967 | Schweinsberg et al. ....... 106/59 |

Primary Examiner—J. Poer
Attorney, Agent, or Firm—Raymond T. Majesko; John N. Hazelwood

[57] ABSTRACT

Burned, magnesite-chrome refractory shapes having a lime to silica ratio between about 1.7 and 2.1 to 1, and a chromic oxide to aluminum oxide plus iron oxide ratio in excess of about 1.5 to 1.

13 Claims, No Drawings

MAGNESITE-CHROME REFRACTORY

BACKGROUND OF THE INVENTION

Refractories made from a mixture of dead burned magnesite and chrome ore hold an important place in industry. These refractories are generally divided into those which have a predominance of chrome ore and those having a predominance of magnesite. This invention is particularly concerned with those having a predominance of magnesite. These refractories are referred to in the art as magnesite-chrome refractories and will thus be designated in the remainder of this specification.

There are various commercial versions of magnesite-chrome refractories. One type is chemically bonded without any burning or firing treatment. Others are burned. The burned refractories are divided into two groups, which generally are defined as (1) silicate-bonded and (2) direct-bonded. The silicate-bonded refractories are characterized by silicate (forsterite, monticellite, or others) filming about or between the chrome ore and magnesite grains, which filming in a sense glues them together. In the direct-bonded type of refractory, the silicate filming has been minimized or substantially eliminated, so that there is a large degree of direct attachment between adjacent chrome ore and magnesite grains. This invention relates to refractories which are primarily silicate-bonded. However, some degree of direct particle to particle attachments is present.

Both the magnesite-chrome and chrome-magnesite refractories, have their relative advantages and disadvantages. Magnesite-chrome refractories generally are considered more refractory; that is, they will sustain greater compressive loads at elevated temperatures. Magnesite-chrome refractories also have greater volume stability under cyclic temperature or atmospheric conditions, since chrome ores contain oxide which readily release oxygen (are reduced) upon heating and pick up oxygen (are oxidized) upon cooling or upon changing the atmosphere. Chrome magnesite refractories are less expensive because the raw material, chrome ore, is less expensive than high purity magnesite.

Current direct-bonded magnesite-chrome brick have good hot strength at elevated temperatures; however, they expand in burning, which prevents the attainment of low porosity. Magnesite-chrome brick with a high lime to silica ratio shrink in burning and have poor hot strength at elevated temperatures.

Accordingly, it is among the objects of the present invention to provide a dense magnesite-chrome brick with a high hot modulus of rupture at 2700° F, little or no subsidence in the load test after 90 min. at 3100° F under 25 psi, high resistance to slag erosion, low modulus of elasticity, and high spalling resistance.

In accordance with the present invention and in attainment of the foregoing object, there is provided a burned basic refractory shape made from a refractory size graded brick-making batch. The batch comprises dead burned magnesite and chrome ore. The shape has a lime to silica ratio between about 1.7 and 2.1 to 1 and a chromic oxide to aluminum oxide plus iron oxide ratio in excess of 1.5 to 1.

In a preferred embodiment, the batch comprises from about 75 to 90%, by weight, dead burned magnesite, and from about 10 to 25%, by weight, chrome ore. The shape has a chromic oxide to aluminum oxide plus iron oxide ratio in excess of about 1.8 to 1. To insure good high temperature strength, the shape should have a boron oxide content of less than about 0.02%. To insure good resistance to spalling, the shape should have an $R_2O_3$ content in excess of about 19%. The term $R_2O_3$ is used to collectively include $Cr_2O_3$, $Al_2O_3$ and $Fe_2O_3$.

The shapes may contain a mixture of chrome ores and magnesites, if desired. They may also contain an addition of chromic oxide. It is preferred that the chrome ores be sized so that they are substantially all $-10$ mesh, and that the chromic oxide employed be a very fine pigment grade.

In accordance with the stated objects, the properties sought to be obtained are set forth below:

a. High temperature modulus of rupture (MOR) at 2700° F — greater than 1000 psi.
b. Good resistance to subsidence — in the load test less than 0.5% subsidence after 90 min. at 3100° F under 25 psi load.
c. Good resistance to slag erosion — less than 4% erosion in AOD slag test. Less than 1% erosion in electric furnace slag test.
d. Low modulus of elasticity — less than $5 \times 10^6$ psi and preferably less than $3 \times 10^6$ psi.
e. High resistance to spalling — in the prism spalling test, no breakage after 15 cycles and preferably no breakage after 30.

Some brick will not meet all of these desired properties, but will still be excellent brick and within scope of this invention.

In the following examples, all mesh sizes are according to the Tyler series. All parts and percentages are by weight. The chemical analyses of all materials are on the basis of an oxide analysis, in conformity with common practice in reporting the chemical content of refractory materials. The various chemical constituents are reported as though they were present as the simple oxides.

The following examples are given by way of explanation and not by way of limitation, in order to move clearly appraise those skilled in the art of the practice of this invention.

EXAMPLE I

A series of 12 magnesite-chrome brick was made with magnesite A and chrome ore A as shown in Table I below. In the odd numbered mixes, the chrome ore was increased from 0 to 20% in 4% increments. The even numbered mixes were identical to the odd numbered mixes, except that 10% of pigment grade $Cr_2O_3$ was substituted for 10% of the magnesite. All bricks were pressed at 12000 psi, dried and burned at 3150° F with a 10 hour hold.

TABLE

| Mix: | 1 | 2 | 3 | 4 | 5 | 6 | 7 | 8 |
| --- | --- | --- | --- | --- | --- | --- | --- | --- |
| Dead Burned Magnesite | 100% | 90% | 96% | 86% | 92% | 82% | 88% | 78% |
| Chome Ore A | 0 | 0 | 4 | 4 | 8 | 8 | 12 | 12 |
| Pigment Grade $Cr_2O_3$ |  | 10 |  | 10 |  | 10 |  | 10 |
| Plus Bonds: | 7.2 | 7.65 | 6.55 | 7.15 | 6.5 | 7.0 | 5.85 | 6.45 |
| Burn Temperature: | | | | 3150° F (10 Hr Hold) | | | | |
| Bulk Density, pcf (Av 5) | 188 | 190 | 190 | 193 | 190 | 193 | 192 | 196 |
| Modulus of Rupture, psi | | | | | | | | |
| At Room Temperature (Av 3) | 3790 | 2480 | 3160 | 1650 | 2490 | 960 | 2360 | 660 |

| TABLE-continued | | | | | | | | |
|---|---|---|---|---|---|---|---|---|
| At 2700° F (Hold Time 5 Hrs) (Av 3) | 2320 | 2260 | 600 | 1830 | 230 | 1340 | 620 | 1190 |
| Apparent Porosity, % (Av 3) | 13.5 | 15.4 | 13.9 | 15.5 | 13.9 | 15.3 | 13.4 | 14.8 |
| Modulus of Elasticity, psi ×10⁶(Av 3) | 16.5 | 13.7 | 17.6 | 9.5 | 16.0 | 3.9 | 13.5 | 2.2 |
| Chemical Analysis (Calcined Basis)* | | | | | | | | |
| Silica ($SiO_2$) | 1.80% | 1.51% | 1.44% | 1.54% | 1.55% | 1.46% | 1.16% | 1.20% |
| Algnia ($Al_2O_3$) | 0.25 | 0.20 | 0.73 | 0.78 | 2.22 | 1.32 | 2.00 | 1.98 |
| Tinania ($TiO_2$) | 0.01 | 0.02 | 0.04 | 0.03 | 0.06 | 0.07 | 0.08 | 0.08 |
| Iron Oxide ($Fe_2O_3$) | 0.17 | 0.15 | 1.32 | 1.12 | 2.44 | 2.00 | 3.44 | 3.18 |
| Chromic Oxide ($Cr_2O_3$) | — | 7.84 | 2.15 | 11.8 | 4.00 | 13.8 | 5.30 | 13.9 |
| Lime (CaO) | 3.13 | 2.89 | 2.51 | 2.53 | 2.40 | 2.47 | 2.29 | 2.28 |
| Boron Oxide ($B_2O_3$) | | | | Less than 0.02% | | | | |
| Magnesia (MgO) | — | 86.4 | — | 81.9 | 87.2 | 78.5 | 86.0 | 77.5 |
| Total Analyzed | 5.36% | 99.0% | 8.19% | 99.7% | 99.9% | 99.6% | 100.3% | 100.1% |
| By Difference Magnesia (MgO) | 94.64 | | 91.81 | | | | | |
| Total | 100.00% | | 100.00% | | | | | |
| Lime to Silica Ratio: | 1.74 | 1.91 | 1.49 | 1.64 | 1.54 | 1.69 | 1.97 | 1.90 |
| $Cr_2O_3/Al_2O_3 + Fe_2O_3$: | — | 22.4 | 1.04 | 6.2 | 0.86 | 4.15 | 0.97 | 2.69 |
| Total $R_2O_3$, % | 0.42 | 8.19 | 4.20 | 13.70 | 8.66 | 17.12 | 10.74 | 19.06 |
| Load Test, 25 psi (Av 1) Maintained Load at 3100° F | | | | | | | | |
| % Subsidence After 1½ Hrs. | 0.1 | +0.1 | 0.2 | 0.0 | 0.6 | 0.0 | 0.2 | 0.1 |
| Gradient Slag Test | | | | | Electric Furnace - 3000° F | | | |
| Erosion, %: | | | | | 0.84 | 0.83 | 2.4 | 0.54 |

| Mix: | 9 | 10 | 11 | 12 |
|---|---|---|---|---|
| Dead Burned Magnesite | 84% | 74% | 80% | 70% |
| Chrome Ore A | 16 | 16 | 20 | 20 |
| Pigment Grade $Cr_2O_3$ | | 10 | | 10 |
| Plus Bonds: | 5.85 | 6.15 | 5.80 | 6.0 |
| Burn Temperature: | | 3150° F (10 Hr Hold) | | |
| Bulk Density, pcf (Av. 5) | 194 | 198 | 196 | 199 |
| Modulus of Rupture, psi | | | | |
| At Room Temperature (Av 3) | 2230 | 570 | 1140 | 450 |
| At 2700° F (Hold Time 5 Hrs) (Av 3) | 340 | 1330 | 340 | 900 |
| Apparent Porosity, % (Av 3) | 13.6 | 15.3 | 13.4 | 15.2 |
| Modulus of Elasticity, psi ×10⁶ (Av 3) | 11.4 | 1.7 | 5.7 | 1.41 |
| Chemical Analysis (Calcined Basis)* | | | | |
| Silica ($SiO_2$) | 1.10% | 1.18% | 1.09% | 1.27% |
| Alumina ($Al_2O_3$) | 2.58 | 2.43 | 3.00 | 3.00 |
| Tinania ($TiO_2$) | 0.10 | 0.11 | 0.13 | 0.13 |
| Iron Oxide ($Fe_2O_3$) | 4.58 | 4.32 | 5.85 | 5.53 |
| Chromic Oxide ($Cr_2O_3$) | 6.65 | 15.8 | 7.76 | 18.3 |
| Lime (CaO) | 2.08 | 2.16 | 2.00 | 2.20 |
| Boron Oxide ($B_2O_3$) | | Less than 0.02% | | |
| Magnesia (MgO) | 83.0 | 74.5 | 80.1 | 70.1 |
| Total Analyzed | 100.1% | 100.5% | 99.9% | 100.4% |
| By Difference Magnesia (MgO) Total | | | | |
| Lime to Silica Ratio: | 1.89 | 1.83 | 1.83 | 1.73 |
| $Cr_2O_3/Al_2O + Fe_2O_3$: | 0.93 | 2.34 | 0.88 | 2.14 |
| Total $R_2O_3$, % | 13.81 | 22.55 | 16.61 | 26.83 |
| Load Test, 25 psi (Av 1) Maintained Load at 3100√ F | | | | |
| % Subsidence After 1½ 2 Hrs. | 0.3 | 1.1 | 0.3 | 0.0 |
| Gradient Slag Test | | AOD Furnace - 3150° F | | |
| Erosion, %: | 3.4 | 2.8 | 4.1 | 2.5 |

*Ey X-ray spectroscope

All of the brick shrank in the burn, but the odd numbered mixes without the $Cr_2O_3$ addition shrank the most, 0.8 to 1.1%. As a result, their apparent porosity was low, 13.4 to 13.9%; their cold strength was high; but their modulus of rupture at 2700° F was poor. The even numbered mixes showed less shrinkage in the burn, 0 to 0.4%, because of the expansive reaction between the magnesia and chromic oxide. However, their apparent porosity ranged from 14.8 to 15.5%; their cold strength decreased from 2480 psi to 450 psi as the chrome ore increased from 0 to 20%, and the brick had high modulus of rupture at 2700° F, 900 to 2260 psi. These latter results confirmed that when the percentage of $Cr_2O_3$ is high relative to the alumina and iron oxide in a magnesite-chrome brick, bonded with dicalcium silicate, the brick will have high hot modulus of rupture.

In other tests, all of the brick showed excellent resistance to subsidence in the load test. Mixes 5 to 12 showed good resistance to erosion in the electric furnace gradient slag test at 3000° F and the AOD gradient slag test at 3150° F. Mixes with the chromic oxide addition were particularly resistant to erosion in these tests.

EXAMPLE II

In this example, a mix containing 88% magnesite A and 12% chrome ore A, was selected as the base mix. To this base mix, 0 to 10% chromic oxide was added in increments of 2% as a replacement for a portion of magnesite A as shown in Table II below. Mixes 13 to 16 were pressed at 18000 psi and mixes 17 and 18 were pressed at 12000 psi. All of the bricks were dried and burned at 3150° F with a 10 hour hold.

TABLE II

| Mix: | 13 | 14 | 15 | 16 | 17 | 18 |
|---|---|---|---|---|---|---|
| Dead Burned Magnesite | 88% | 86% | 84% | 82% | 80% | 78% |

TABLE II-continued

| | | | | | | |
|---|---|---|---|---|---|---|
| Chrome Ore A | 12 | 12 | 12 | 12 | 12 | 12 |
| Chromic Oxide | 0 | 2 | 4 | 6 | 8 | 10 |
| Plus Bonds: | 6.45 | | | 6.30 | | |
| Burn: | | | 3150° F 10 Hr Hold | | | |
| $Cr_2O_3/Al_2O_3+Fe_2O_3$ Ratio: | 0.86 | 1.14 | 1.48 | 1.84 | 2.21 | 2.54 |
| Bulk Density, pcf (Av 5) | 193 | 193 | 194 | 194 | 193 | 194 |
| Modulus of Rupture, psi | | | | | | |
| At Room Temperature (Av 3) | 2560 | 2120 | 2600 | 1210 | 580 | 470 |
| At 2700° F (Hold Time 5 Hrs) (Av 3) | 140 | 580 | 1030 | 1290 | 1080 | 990 |
| Apparent Porosity, % (Av 3) | 12.9 | 13.8 | 13.7 | 14.6 | 16.6 | 16.1 |
| Modulus of Elasticity, psi × $10^6$ (Av 3) | 15.2 | 13.1 | 13.3 | 7.9 | 2.8 | 1.7 |
| Chemical Analysis (Calcined Basis)* | | | | | | |
| Silica ($SiO_2$) | 1.11% | 1.15% | 1.21% | 1.22% | 1.38% | 1.42% |
| Alumina ($Al_2O_3$) | 2.24 | 2.20 | 2.20 | 2.59 | 2.55 | 2.66 |
| Titania ($TiO_2$) | 0.09 | 0.08 | 0.08 | 0.09 | 0.09 | 0.09 |
| Iron Oxide ($Fe_2O_3$) | 3.60 | 3.55 | 3.42 | 3.65 | 3.50 | 3.70 |
| Chromic Oxide ($Cr_2O_3$) | 5.00 | 6.60 | 8.30 | 11.5 | 13.4 | 16.2 |
| Lime (CaO) | 2.12 | 2.14 | 2.22 | 2.22 | 2.35 | 2.49 |
| Boron Oxide ($B_2O_3$) | | | Less than 0.02% | | | |
| Magnesia (MgO) | 84.9 | 82.9 | 81.0 | 77.1 | 75.7 | 72.1 |
| Total Analyzed | 99.1% | 97.9% | 98.4% | 98.4% | 99.0% | 98.7% |
| Lime-to-Silica Ratio: | 1.90 | 1.86 | 1.83 | 1.82 | 1.70 | 1.75 |
| $Cr_2O_3/Al_2O_3+Fe_2O_3$ Ratio: | 0.86 | 1.14 | 1.48 | 1.84 | 2.21 | 2.54 |
| Total $R_2O_3$, %: | 10.84 | 12.35 | 13.92 | 17.74 | 19.45 | 22.56 |
| Load Test, 25 psi (Av 1) Maintained Load at 3100° F, psi % Subsidence After 1½ Hrs: | 0.2 | 0.3 | 0.1 | 0.2 | 0.0 | 0.0 |
| AOD Gradient Slag Test at 3150° F 3600 Grams Synthetic Slag Percent Eroded: | | 3.1 | 4.0 | 3.3 | 2.8 | |

*By X-ray spectroscope

As the percentage of chromic oxide increased, the linear change in burning gradually changed from −0.8 to +0.1%; the cold strength decreased from 2550 to 470 psi, the apparent porosity increased from 12.9 to 16.1%; and the modulus of elasticity decreased from 15.2 × $10^6$ to 1.7 × $10^6$ psi. There was a sharp increase in the modulus of rupture at 2700° F, from 140 to 1030 psi, as the chromic oxide addition increased from 0 to 4% to give a $Cr_2O_3/Al_2O_3 + Fe_2O_3$ ratio of 1.48 to 1. In the load test at 3100° F, with a 90 min. hold, all of the brick showed low subsidence with mixes 17 and 18, with the 8 and 10% chromic oxide addition, showing no subsidence at all.

Mixes 14, 15, 16 and 17 were tested in the AOD, gradient slag test at 3150° F. Their erosion varied from 2.8 to 4.0%.

Microscopic examination showed that burned magnesite-chrome mixes 13–18 were quite similar to each other. These samples had a fair to good secondary spinel formation and magnesia to chrome ore attachment, but a majority of the chrome ore grains were surrounded by voids.

EXAMPLE III

A series of burned magnesite-chrome brick was made with a dicalcium silicate bond, 12% chrome ore plus 11 to 4.5% chromic oxide. The $Cr_2O_3/Al_2O_3 + Fe_2O_3$ ratio was maintained constant at about 2.7 to 1 by gradually replacing chrome ore A with chrome ore B, as the percentage of pigment grade $Cr_2O_3$ was reduced. All brick in Table III below were pressed at 12000 psi, dried and burned at 3150° F with a 10 hour hold.

TABLE III

| Mix: | 19 | 20 | 21 | 22 | 23 |
|---|---|---|---|---|---|
| Dead Burned Magnesite | 77% | 78.6% | 80.2% | 81.8% | 83.5% |
| Chrome Ore A | 12 | 9 | 6 | 3 | — |
| Chrome Ore B | — | 3 | 6 | 9 | 12 |
| Chromic Oxide | 11 | 9.4 | 7.8 | 6.2 | 4.5 |
| Plus Bonds: | | | | 6.3 | |
| Burn: | | 3150° F 10 Hr Hold | | | |
| Bulk Density, pcf (Av 5) | 193 | 194 | 193 | 192 | 192 |
| Modulus of Rupture, psi | | | | | |
| At Room Temperature, (Av 3) | 530 | 640 | 880 | 1230 | 1800 |
| At 2700° F (Hold Time 5 Hrs) (Av 3) | 1020 | 1040 | 1420 | 1330 | 1670 |
| Apparent Porosity, % (Av 3) | 16.7 | 15.9 | 15.3 | 15.5 | 15.0 |
| Modulus of Elasticity, psi ×$10^6$(Av 3) | 1.74 | 2.35 | 2.53 | 6.34 | 11.0 |
| Chemical Analysis (Calcined Basis)* | | | | | |
| Silica ($SiO_2$) | 1.29% | 1.20% | 1.36% | 1.28% | 1.34 |
| Alumina ($Al_2O_3$) | 2.62 | 2.00 | 1.94 | 1.82 | 1.79 |
| Titania ($TiO_2$) | 0.09 | 0.07 | 0.06 | 0.06 | 0.04 |
| Iron Oxide ($Fe_2O_3$) | 3.57 | 2.97 | 2.82 | 2.43 | 2.25 |
| Chromic Oxide ($Cr_2O_3$) | 16.6 | 13.6 | 13.3 | 11.3 | 10.7 |
| Lime (CaO) | 2.33 | 2.15 | 2.38 | 2.20 | 2.30 |
| Boron Oxide ($B_2O_3$) | | | Less than 0.02% | | |
| Magnesia (MgO) | 72.5 | 76.2 | 76.9 | 79.9 | 80.5 |
| Total Analyzed | 99.0% | 98.2% | 98.8% | 99.0% | 98.9% |
| Lime-to-Silica Ratio: | 1.81 | 1.79 | 1.75 | 1.72 | 1.72 |
| $Cr_2O_3/Al_2O_3+Fe_2O_3$ Ratio: | 2.68 | 2.74 | 2.79 | 2.66 | 2.65 |
| Total $R_2O_3$, %: | 22.79 | 18.57 | 18.06 | 15.55 | 14.74 |
| Load Test, 25 psi (Av 1) Maintained Load at 3100° F, psi % Subsidence After 1½ Hrs: | 0.00 | 0.00 | 0.00 | 0.00 | 0.00 |

*By X-ray spectroscope

The linear change in burning shifted from a slight expansion to a slight shrinkage as the chrome ore B replaced the chrome ore A and the pigment grade chromic oxide was reduced. All of the brick had a modulus of rupture at 2700° F over 1000 psi and none of the brick showed any subsidence in the load test at 3100° F with a 90 min. hold.

These results showed that the $Cr_2O_3$ from the chrome ore is as effective as the $Cr_2O_3$ from the pigment grade chromic oxide in producing high hot strength in the burned magnesite-chrome brick bonded with dicalcium silicate. In addition, the $Cr_2O_3$ in chrome ore produces less expansion in the burn which leads to lower porosity.

Microscopically, these mixes had a fair secondary spinel formation and a small amount of magnesia to chrome ore attachment. There was a moderate amount of silicate bonding.

EXAMPLE IV

A series of six magnesite-chrome brick, as identified in Table IV below, was made from 78% magnesite A, 12% chrome ore A and 10% $Cr_2O_3$ which would give a $Cr_2O_3/Al_2O_3 + Fe_2O_3$ ratio of about 2.5 to 1. The lime to silica ratio of the brick was varied between 2.4 and 1.0 to 1. In addition, a brick was made (mix 30) with 78% magnesite B, 12% chrome ore A and 10% chromic oxide with a volatilized silica addition that would yield a very low lime to silica ratio. Another series of brick was made like mixes 17 and 18 in Table II, that had excellent hot strength except the magnesite A was replaced with magnesite C to determine what effect the higher $B_2O_3$ content of the magnesite C would have on hot strength. All of the brick in this study were pressed at 12000 psi and burned at 3150° F with a 10 hour hold.

As the lime to silica ratio decreased from about 2.4 to 1.0 to 1, mixes 24 to 29, the linear shrinkage in the burn increased from 0 to 0.7%, and there was a small decrease in porosity. The modulus of rupture at 2700° F increased from 550 psi at a ratio of 2.4 to 1, to a maximum of 1510 psi, when the lime to silica ratio was 1.82 to 1. It maintained a value of 1270 psi at 1.67 to 1, then fell abruptly to 290 psi when the ratio was dropped to 1.24 to 1. It appears that the hot strength in this brick acted in a manner similar to 100% magnesite brick when there is a variation in the lime to silica ratio. The change in lime to silica ratio in mixes 24 to 29 did not effect the degree of subsidence in the load test at 3100° F. Four mixes, 25, 26, 27 and 28 were tested in the AOD slag test at 3150° F. The erosion varied from 2.7 to 3.4%, which is considered to be excellent.

The two mixes, 31 and 32, were made with magnesite C, replacing the magnesite A to increase the $B_2O_3$ content of the brick. This was done to determine if $B_2O_3$ adversely affects hot modulus of rupture in the brick. All the factors that had been found to give high hot strength, were favorable, such as, lime to silica ratio of 1.8 to 1, $Cr_2O_3/Al_2O_3 + Fe_2O_3$ ratio of 2.2 to 2.5 to 1, low porosity of 14.6. However, the modulus of rupture at 2700° F of this brick was only 550 psi. Since the $B_2O_3$ content of mixes 31 and 32 were 0.066%, $B_2O_3$ must be considered harmful to these burned magnesite-chrome brick with a dicalcium silicate bond.

EXAMPLE V

A variety of burned magnesite-chrome brick, identified in Table V below, with a dicalcium silicate bond were made to define compositions that would have high hot strength and good spalling resistance. All brick in this series were pressed at 12000 psi and burned at 3150° F with a 10 hour hold.

TABLE IV

| Mix: | 24 | 25 | 26 | 27 | 28 | 29 | 30 | 31 | 32 |
|---|---|---|---|---|---|---|---|---|---|
| Dead Burned Magnesite | | | | 78% | | | | 80% | 78% |
| Chrome Ore A | 12 | 12 | 12 | 12 | 12 | 12 | 12 | 12 | 12 |
| Chromic Oxide | 10 | 10 | 10 | 10 | 10 | 10 | 10 | 8 | 10 |
| Plus Bonds: | 5.90 | 6.10 | 6.30 | 5.70 | 4.75 | 5.05 | 4.40 | 6.30 | 6.30 |
| Burn: | | | | 3150° F, 10 Hr Hold | | | | | |
| Bulk Density, pcf (Av 6) | 195 | 196 | 197 | 197 | 197 | 198 | 193 | 199 | 199 |
| Modulus of Rupture, psi | | | | | | | | | |
| As Room Temperature (Av 3) | 750 | 590 | 780 | 840 | 660 | 630 | 650 | 1090 | 710 |
| As 2700° F (Hold Time 5 Hrs) (Av 3) | 550 | 1340 | 1510 | 1270 | 290 | 140 | 420 | 550 | 550 |
| Apparent Porosity (Av 3) | 16.1 | 15.3 | 15.2 | 15.0 | 15.3 | 14.8 | 16.5 | 14.7 | 14.6 |
| Modulus of Elasticity, psi × 10⁶ (Av 3) | 2.53 | 2.90 | 2.40 | 2.77 | 2.34 | 2.22 | 2.4 | 5.32 | 2.71 |
| Chemical Analysis (Calcined Basis)* | | | | | | | | | |
| Silica ($SiO_2$) | 1.00% | 1.12% | 1.22% | 1.29% | 1.61% | 1.82% | 1.46% | 1.23% | 1.34% |
| Alumina ($Al_2O_3$) | 2.59 | 2.30 | 2.30 | 2.61 | 2.71 | 2.62 | 2.17 | 2.22 | 2.68 |
| Titania ($TiO_2$) | 0.09 | 0.09 | 0.09 | 0.09 | 0.10 | 0.09 | 0.09 | 0.09 | 0.10 |
| Iron Oxide ($Fe_2O_3$) | 3.50 | 3.42 | 3.50 | 3.57 | 3.67 | 3.53 | 3.35 | 3.60 | 3.65 |
| Chromic Oxide ($Cr_2O_3$) | 14.9 | 14.8 | 14.5 | 14.9 | 15.9 | 15.7 | 14.1 | 13.0 | 15.9 |
| Lime (CaO) | 2.40 | 2.33 | 2.23 | 2.16 | 1.99 | 1.93 | 0.59 | 2.18 | 2.41 |
| Magnesia (MgO) | 74.8 | 74.8 | 75.3 | 74.3 | 73.4 | 73.3 | 77.0 | 77.0 | 73.1 |
| Boron Oxide ($B_2O_3$) | — | — | 0.018 | — | — | — | 0.035 | 0.066 | 0.066 |
| Total Analyzed | 99.3% | 98.9% | 99.2% | 100.0% | 98.9% | 99.0% | 98.8% | 99.3% | 99.3% |
| $CaO/SiO_2$ Ratio: | 2.40 | 2.08 | 1.82 | 1.67 | 1.24 | 1.06 | 0.40 | 1.77 | 1.80 |
| $Cr_2O_3/Fe_2O_3 + Al_2O_3$ Ratio: | 2.45 | 2.59 | 2.50 | 2.41 | 2.49 | 2.55 | 2.55 | 2.23 | 2.51 |
| Total $R_2O_3$: | 20.99 | 20.52 | 20.3 | 21.08 | 22.38 | 21.85 | 19.62 | 18.82 | 22.23 |
| Load Test, 25 psi (AV 1) Maintained Load at 3100° F | | | | | | | | | |
| % Subsidence After 1½ Hrs: | 0.2 | 0.1 | 0.3 | 0.2 | 0.3 | 0.4 | — | 0.1 | 0.2 |
| AOD Gradient Slag at 3150° F, 3600 Grams Synthetic Slag | | | | | | | | | |
| Percent Eroded: | — | 2.9 | 2.7 | 2.9 | 3.4 | — | | | |

*By X-ray spectrograph except $B_2O_3$ by emission spectrograph.

TABLE V

| Mix: | 33 | 34 | 35 | 36 | 37 | 38 | 39 | 40 |
|---|---|---|---|---|---|---|---|---|
| Dead Burned Magnesite | 86% | 85% | 82% | 78% | 78% | 78% | 80.2% | 82% |
| Chrome Ore A | | | 12 | 12 | 12 | 12 | 6 | 12 |

TABLE V-continued

| | | | | | | | | |
|---|---|---|---|---|---|---|---|---|
| Chrome Ore B | 12 | 12 | | | 10 | 10 | 6 | — |
| Chrome Oxide | 2 | 3 | 6 | 10 | | | 7.8 | 6.0 |
| Plus Bonds: | 6.30 | | 5.20 | | 5.40 | 6.95 | 6.30 | 6.30 |
| Burn, Temperature: | | | | 3150° F 10 Hr Hold | | | | |
| Bulk Density, pcf (Av 5) | 190 | 191 | 195 | 192 | 189 | 183 | 198 | 197 |
| Modulus of Rupture, psi | | | | | | | | |
| At Room Temperature (Av 3) | 2830 | 1820 | 800 | 420 | 720 | 560 | 1090 | 1410 |
| At 2700° F (Hold Time 5 Hrs (Av 3) | 1790 | 1720 | 190 | 280 | 440 | 410 | 1500 | 1050 |
| Apparent Porosity, % (Av 3) | 16.3 | 15.4 | 14.0 | 16.8 | 17.7 | 19.8 | 13.6 | 12.9 |
| Modulus of Elasticity, psi × $10^6$ (Av 3) | 13.74 | 12.71 | 4.05 | 1.47 | 2.28 | 2.11 | 4.80 | 9.49 |
| Prism Spalling Test at 2200° F | | | | | | | | |
| Cycles to Failure: | | | | | | | | |
| 1 | 2 | 5 | 22 | 30 | 30 | 30 | 22 | 24 |
| 2 | 3 | 5 | 23 | 30 | 30 | 30 | 5 | 5 |
| 3 | 2 | 5 | 29 | 30 | 30 | 30 | 17 | 5 |
| (Av 3) | 2 | 5 | 25 | (No Failures) | | | 15 | 11 |
| Chemical Analysis (Calcined Basis)* | | | | | | | | |
| Silica ($SiO_2$) | 1.25% | 1.28% | 1.25% | 1.45% | 2.33% | 3.35% | 1.21% | 1.28% |
| Aluminia ($Al_2O_3$) | 1.64 | 1.67 | 2.61 | 2.14 | 1.97 | 1.79 | 1.76 | 1.82 |
| Titania ($TiO_2$) | 0.04 | 0.03 | 0.08 | 0.10 | 0.08 | 0.06 | 0.05 | 0.07 |
| Iron Oxide ($Fe_2O_3$) | 1.95 | 2.05 | 3.60 | 3.40 | 3.20 | 3.00 | 2.50 | 3.00 |
| Chromic Oxide ($Cr_2O_3$) | 7.65 | 9.20 | 11.8 | 15.3 | 13.8 | 12.2 | 12.0 | 9.3 |
| Lime (CaO) | 2.48 | 2.56 | 2.53 | 2.31 | 0.52 | 0.53 | 2.48 | 2.52 |
| Magnesia (MgO) | 83.4 | 81.8 | 76.9 | 74.4 | 76.4 | 77.3 | 78.2 | 80.1 |
| Boron Oxide ($B_2O_3$) | | | 0.082 | | 0.1 | 0.1 | 0.016 | 0.017 |
| Lime-to-Silica Ratio: | 1.98 | 2.00 | 2.62 | 1.59 | 0.22 | 0.16 | 2.05 | 1.97 |
| $Cr_2O_3/Al_2O_3 + Fe_2O_3$ Ratio: | 2.13 | 2.47 | 1.90 | 2.76 | 2.67 | 2.54 | 2.82 | 1.93 |
| Total $R_2O_3$: | 11.24 | 12.92 | 18.01 | 20.84 | 18.97 | 16.99 | 16.26 | 14.12 |
| AOD Gradient Slag Test at 3150° F, 3600 Grams Synthetic Slag | | | | | | | | |
| Percent Eroded: | | | | | | | 4.1 | 3.0 |

*By X-ray spectrograph except $B_2O_3$ by emission spectrograph.

Mixes 33 and 34 were made with chrome ore B and magnesite A with additions of only 2 and 3% pigment grade chromic oxide. Their $Cr_2O_3/Al_2O_3 + Fe_2O_3$ ratio was 2.13 and 2.47 to 1 and the brick had excellent modulus of rupture at 2700° F.

However, their modulus of elasticity was high and their spalling resistance was low as judged by the results of the prism spalling test.

Mix 35 was made with 12% chrome ore A, 82% magnesite A, 6% chromic oxide and had an addition of 0.16% boric acid, which increased the $B_2O_3$ content in the burned brick to 0.082%. This sharply reduced the high modulus of rupture to 190 psi. The same mix was made in Table II (mix 16) without a boric acid addition and its modulus of rupture at 2700° F was 1290 psi. This result confirms the study made and reported in Table IV (mixes 31 and 32), that the $B_2O_3$ in this type brick adversely affects high hot modulus of rupture.

Mix 36 was intended to determine if the lime to silica ratio in this burned magnesite-chrome brick with relatively high lime content, could be lower than about 1.7 to 1 and still have a high hot modulus of rupture. Mix 36 had a lime to silica ratio of 1.59 to 1 and a modulus of rupture at 2700° F of only 280 psi. Accordingly, the ratio of about 1.7 to 1 appears to be the lower limit. Mixes 37 and 38 were intended to determine that if forsterite was the dominant silicate mineral rather than dicalcium silicate, whether the brick would have high hot strength. These brick were made with 78% magnesite B, 12% chrome ore A, 10% $Cr_2O_3$ plus 1.8 and 2.8% volatilized silica. These burned brick had hot modulus of ruptures of 440 psi and 410 psi. The magnesite B also contains 0.13% $B_2O_3$ which probably had an adverse effect on hot strength.

The final two mixes are 39 and 40. Mix 39 contained 6% chrome ore A, 6% chrome ore B, 7.8 chromic oxide and 80.2% magnesite A. Mix 40 contained 12% chrome ore A, 82% magnesite A and 6% chromic oxide. Both brick had an excellent combination of properties, i.e. low porosity, high hot strength and good resistance to AOD slag. The one shortcoming was a lack of good spalling resistance.

The results of the prism spalling test were plotted against the total $R_2O_3$ of all the brick in this example. From this data, the correlation coefficient was 0.94 with 1.0 being perfect correlation. A regression analysis of this data indicated than an excess of 19% $R_2O_3$ would be required for the brick to withstand 30 cycles in the spalling test without breaking.

The chemical analyses of the magnesites and chrome ores used in the examples are given in Table VI below.

TABLE VI

| | Chrome Ore | | Dead Burned Magnesite | | |
|---|---|---|---|---|---|
| | A | B | A | B | C |
| Chemical Analysis (Calcined Basis)* | | | | | |
| Silica ($SiO_2$) | 1.05% | 1.37% | 0.7% | 0.8% | 0.8% |
| Alumina ($Al_2O_3$) | 15.2 | 10.7 | 0.2 | 0.2 | 0.2 |
| Titania ($TiO_2$) | 0.59 | 0.16 | — | — | — |
| Iron Oxide ($Fe_2O_3$) | 26.4 | 16.8 | 0.2 | 0.2 | 0.2 |
| Chromic Oxide ($Cr_2O_3$) | 45.0 | 56.5 | — | — | 0.3 |
| Lime (CaO) | 0.21 | 0.14 | 2.4 | 0.6 | 2.3 |
| Magnesia (MgO) | 11.5 | 14.5 | 96.5 | 98.1 | 96.1 |
| Boron Oxide ($B_2O_3$) | — | — | 0.02 | 0.11 | 0.11 |

*By X-ray spectrograph

The properties of the mixes in the examples were measured by the methods identified below:

Bulk density — ASTM Test C - 134

Modulus of rupture, room temperature — ASTM Test C - 133
Modulus of rupture, 2700° F - ASTM Test C - 583
Apparent porosity — ASTM Test C - 20
Modulus of elasticity — HW 6G
Prism spalling test — HW 9P
Electric furnace slag test — HW 12G (at 3000° F)
AOD gradient slag test — HW 12G (at 3150° F)
Load Test — ASTM Test C - 16

Also, in the above examples, the magnesite was sized −4 mesh through fines and the chrome ore was sized −10 mesh through fines. A typical size grading for all of the mixes in the examples would fall substantially within the ranges set forth in Table VII below:

TABLE VIII

| Mesh | Percent |
|---|---|
| −4+28 | 45–55 |
| −28+65 | 5–15 |
| −65 | 35–45 |
| −325 | 25–30 |

It is intended that the foregoing description be construed as illustrative and not in limitation of the invention.

The embodiments of the invention in which an exclusive property or privilege is claimed are defined as follows:

1. A burned basic refractory shape made from a refractory size graded brickmaking batch, said batch comprising dead burned magnesite and chrome ore, said shape having a lime dead burned magnesite and chrome ore, said shape having a lime to silica ratio between about 1.7 and 2.1 to 1 and a chromic oxide to aluminum oxide plus iron oxide ratio in excess of about 1.5 to 1.

2. A shape according to claim 1, in which the chromic oxide to aluminum oxide plus iron oxide ratio is in excess of about 1.8 to 1.

3. A shape according to claim 1, which contains, in addition, pigment grade chromic oxide.

4. A shape according to claim 1, in which substantially all of the chrome ore is −10 mesh.

5. A burned basic refractory shape made from a refractory size graded brickmaking batch, said batch comprising from about 75 to 90%, by weight, dead burned magnesite and from about 10 to 25%, by weight, chrome ore, said shape having a lime to silica ratio between about 1.7 and 2.1 to 1 and a chromic oxide to aluminum oxide plus iron oxide ratio in excess of about 1.5 to 1.

6. A shape according to claim 5, which contains, in addition, pigment grade chromic oxide.

7. A burned basic refractory shape, having high hot strength at 2700° F, good resistance to subsidence and slag erosion and low modulus of elasticity, made from a refractory size graded brickmaking batch, said batch comprising from about 75 to 90%, by weight, dead burned magnesite and from about 10 to 25%, by weight, chrome ore, said shape having a lime to silica ratio between about 1.7 and 2.1 to 1, a chromic oxide to aluminum oxide plus iron oxide ratio in excess of about 1.5 to 1, and a boric oxide content of less than about 0.02%.

8. A shape according to claim 7, which contains, in addition, pigment grade chromic oxide.

9. A burned basic refractory shape, having high hot strength at 2700° F, good resistance to subsidence and slag erosion, low modulus of elasticity and high spalling resistance, made from a refractory size graded brickmaking batch, said batch comprising from about 75 to 90%, by weight, dead burned magnesite and from about 10 to 25%, by weight, chrome ore, said shape having a lime to silica ratio between about 1.7 and 2.1 to 1, a chromic oxide to aluminum oxide plus iron oxide ratio in excess of about 1.5 to 1, a boric oxide content of less than about 0.02% and an $R_2O_3$ content in excess of about 19%.

10. A shape according to claim 9, which contains a mixture of chrome ores.

11. A shape according to claim 9, which contains, in addition, pigment grade chromic oxide.

12. A shape according to claim 9, in which the chromic oxide to aluminum oxide plus iron oxide ratio is in excess of about 1.8 to 1.

13. A shape according to claim 9, in which substantially all of the chrome ore is −10 mesh.

* * * * *

UNITED STATES PATENT OFFICE
CERTIFICATE OF CORRECTION

Patent No. 4,071,370  Dated Jan. 31, 1978

Inventor(s) Ben Davies

It is certified that error appears in the above-identified patent and that said Letters Patent are hereby corrected as shown below:

In the claims:

Claim 1, lines 31 and 32, delete "dead burned magnesite and chrome ore, said shape having a lime".

Signed and Sealed this

Sixteenth Day of May 1978

[SEAL]

Attest:

RUTH C. MASON  
Attesting Officer

LUTRELLE F. PARKER  
Acting Commissioner of Patents and Trademarks